US008620956B2

(12) United States Patent
Wang et al.

(10) Patent No.: US 8,620,956 B2
(45) Date of Patent: Dec. 31, 2013

(54) EDUCATIONAL ENTITY ARCHITECTURE AND OBJECT MODEL

(75) Inventors: Lei Wang, Redmond, WA (US); Mohamed Rouatbi, Bellevue, WA (US); Rajeev Kumar Mittal, Redmond, WA (US); Parul Ranjit Manek, Redmond, WA (US); Zubin Alexander, Bothell, WA (US); Kevin C. Gammill, Beaux Arts, WA (US); Ellery Charlson, Bothell, WA (US); Xin Li, Redmond, WA (US); Zhipeng Zhao, Bellevue, WA (US); Qin Zhou, Kirkland, WA (US); Yuan-Fen Kuo, Redmond, WA (US); Manjusha Madhav Mangaonkar, Bellevue, WA (US); Tony Kao, Lynnwood, WA (US)

(73) Assignee: Microsoft Corporation, Redmond, WA (US)

( * ) Notice: Subject to any disclaimer, the term of this patent is extended or adjusted under 35 U.S.C. 154(b) by 421 days.

(21) Appl. No.: 12/485,063

(22) Filed: Jun. 16, 2009

(65) Prior Publication Data

US 2010/0318589 A1    Dec. 16, 2010

(51) Int. Cl.
*G06F 7/00* (2006.01)
*G06F 17/30* (2006.01)
(52) U.S. Cl.
USPC ........... 707/791; 707/802; 707/954; 707/955; 707/959; 705/327
(58) Field of Classification Search
USPC ................................ 707/954, 791
See application file for complete search history.

(56) References Cited

U.S. PATENT DOCUMENTS

| | | | |
|---|---|---|---|
| 6,178,308 B1 | 1/2001 | Bobrow et al. |
| 6,368,110 B1 | 4/2002 | Koenecke et al. |
| 6,442,748 B1 | 8/2002 | Bowman-Amuah |
| 6,587,668 B1 | 7/2003 | Miller et al. |
| 6,622,003 B1 | 9/2003 | Denious et al. |
| 6,701,125 B1 | 3/2004 | Lohse |
| 6,907,223 B2 | 6/2005 | Murphy |
| 6,988,138 B1 | 1/2006 | Alcorn et al. |
| 7,326,056 B1 | 2/2008 | Foster |
| 7,558,853 B2 | 7/2009 | Alcorn et al. |

(Continued)

OTHER PUBLICATIONS

"Welcome to Florida International University Course Catalogs—http://caltalog.fiu.edu/index.php?id=87", 2006.*

(Continued)

*Primary Examiner* — Binh V Ho
(74) *Attorney, Agent, or Firm* — Gonzalez Saggio & Harlan LLP (57) ABSTRACT

Described is a technology in which a set of objects represent educational entities of an educational model, with relationships between objects. For example, a course object instance may have a relationship with a task instance and a user instance (such as representing a student). Other objects may include user credentials objects, group objects, degree program objects, course plan objects, institution objects, school objects, and/or department objects. The set of objects may be pre-defined and maintained in a persistent storage; this pre-defined set may be extended with an extended object that has relationships with pre-defined objects. The educational entities of an object model may be maintained in rows of a table, with each row having a field that identifies which entity is represented by that row. The table is accessed to determine relationships between an instantiated object for an entity and at least one other instantiated object for another entity.

17 Claims, 8 Drawing Sheets

(56) References Cited

U.S. PATENT DOCUMENTS

| | | |
|---|---|---|
| 2002/0102525 A1 | 8/2002 | Coppolino |
| 2003/0055842 A1* | 3/2003 | Fields et al. ............... 707/104.1 |
| 2003/0069866 A1* | 4/2003 | Ohno ............................ 706/16 |
| 2004/0110119 A1* | 6/2004 | Riconda et al. ............... 434/350 |
| 2004/0248074 A1 | 12/2004 | Hoyashita et al. |
| 2005/0053908 A1* | 3/2005 | Satheesh et al. .............. 434/350 |
| 2005/0227216 A1 | 10/2005 | Gupta |
| 2006/0035206 A1* | 2/2006 | Clark et al. .................. 434/350 |
| 2006/0040248 A1 | 2/2006 | Aaron |
| 2006/0292542 A1 | 12/2006 | Levy |
| 2007/0255805 A1* | 11/2007 | Beams et al. ................. 709/218 |
| 2008/0004887 A1 | 1/2008 | Brunswig et al. |
| 2008/0098008 A1 | 4/2008 | Eid |
| 2008/0102427 A1* | 5/2008 | Nissle ........................... 434/322 |
| 2008/0215731 A1* | 9/2008 | Redd et al. ................... 709/225 |
| 2008/0216142 A1* | 9/2008 | Goldberg et al. ............. 725/115 |
| 2008/0318197 A1* | 12/2008 | Dion ............................ 434/322 |
| 2008/0319804 A1 | 12/2008 | Pulnikova |
| 2009/0006440 A1 | 1/2009 | Tolskyakov et al. |
| 2009/0182716 A1* | 7/2009 | Everhart et al. ................... 707/3 |
| 2009/0263779 A1* | 10/2009 | White Nye .................... 434/362 |
| 2009/0280462 A1 | 11/2009 | Yaskin |
| 2009/0291426 A1 | 11/2009 | Polivka |
| 2009/0325139 A1 | 12/2009 | Lloyd et al. |
| 2010/0223194 A1* | 9/2010 | Adams .......................... 705/327 |
| 2010/0316987 A1 | 12/2010 | Charlson et al. |
| 2010/0318657 A1 | 12/2010 | Charlson et al. |

OTHER PUBLICATIONS

"Welcome to Florida International University Course Catalogs—http://catalog.fiu.edu/index.php?id=87", 2006.*

Kruchten Philippe B., "The 4+1 View Model of Architecture", Retrieved at <<http://ieeexplore.ieee.org/stamp/stamp.jsp?arnumber=469759&isnumber=9910>>, Nov. 1995, pp. 42-50.

Bohrer K. A., "Architecture of the San Francisco Frameworks", Retrieved at <<http://www.research.ibm.com/journal/sj/372/bohrer.html>>, vol. 37, No. 2, 1998, pp. 1-12.

Simon, et al., "Elena: A Mediation Infrastructure for Educational Services", Retrieved at <<http://www.kbs.uni-hannover.de/Arbeiten/Publikationen/2002/elena_draft_simon.pdf>>, WWW2003, Budapest, Hungary, May 20-24, 2003, Pages 4.

Sampson, et al., "An Architecture for Web-based e-Learning Promoting Re-usable Adaptive Educational e-Content", Retrieved at <<http://www.ifets.info/journals/5_4/sampson.html>>, Educational Technology & Society 5 (4), 2002, Pages 15.

Non-Final Office Action dated Nov. 9, 2011 from U.S. Publication 20100316987 (US. Appl. No. 12/485,067), 15 pages.

Final Office Action dated Apr. 26, 2012 from U.S. Publication 20100316987 (U.S. Appl. No. 12/485,067), 16 pages.

Non-Final Office Action dated Oct. 9, 2012 from U.S. Publication 20100316987 (U.S. Appl. No.12/485,067), 15 pages.

Final Office Action dated Apr. 11, 2013 from U.S. Publication 20100316987 (U.S. Appl. No. 12/485,067), 15 pages.

Non-Final Office Action dated Aug. 1, 2013 from U.S. Publication 20100316987 (U.S. Appl. No. 12/485,067), 17 pages.

* cited by examiner

| EntityPropertyBag | |
|---|---|
| PK | ApplicationID |
| PK,FK1 | EntityServerID |
| PK,FK1 | EntityID |
| PK | PropName |
| | SeqTracker |
| | PropValue |
| | CreateDate |
| | UpdateTimeStamp |
| | UpdateCount |

(F)

| EntityItemLink | |
|---|---|
| PK,FK1,FK2 | EntityServerId |
| PK,FK1 | EntityId |
| PK | ItemServerId |
| PK,FK2 | ItemId |
| | CreateDate |
| | EffectiveStartDate |
| | EffectiveEndDate |
| | UpdateTimestamp |

EDUCATIONAL ENTITY ARCHITECTURE AND OBJECT MODEL

CROSS-REFERENCE TO RELATED APPLICATION

The present application is related to copending U.S. patent application Ser. No. 12/485,067 entitled "Educational Service and Contracts," filed concurrently herewith, assigned to the assignee of the present application, and hereby incorporated by reference.

BACKGROUND

Education is an area in which various entities, such as courses, tasks, institution, school, department, degree programs and so forth have many relationships between them. Some of these entities are fairly stable over time, while others change fairly often. For example, new courses are added and others removed fairly often, while each course's tasks are changed and updated regularly. However the school or schools for an institution are relatively stable, although its related data (e.g., users) change.

At the same time, educational institutions have a number of needs that are somewhat tailored to their individual circumstances. For example, an elementary school and a university have different needs. Heretofore, there was no efficient way to capture such relationships in a way that is organized, yet at the same time flexible and extensible for the varied circumstances of educational institutions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a set of objects represent educational entities of an educational model, each object having a relationship with at least one other object. For example, a course object represents a course, and when instantiated into a course instance, has a relationship with a task instance that includes task-related information for access by users of the educational model. A user object (when instantiated) represents a user of the educational model, and may include data corresponding to at least one course and at least one task.

In addition to course objects, task objects and user objects, the set of objects may include a user credentials object, a group object, a degree program object, a course plan object, an institution object, a school object, and/or a department object.

In one implementation, the set of objects is maintained in a persistent storage as a pre-defined set of objects. This pre-defined set may be extended with an extended object, including associating the extended object with at least one object of the pre-defined set of objects.

In one implementation, the educational entities of an object model are maintained in rows of a table. Each row having a field that identifies which entity of the object model is represented by that row. In use, the table is accessed to determine relationships between an instantiated object for an entity and at least one other instantiated object for another entity. For example, for a course object instance that identifies a course, the table may be accessed to determine a user object instance that represents a student taking that course. Via the table, a task object instance may have a relationship with the course object instance and the user object instance.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards an educational entity architecture and object model that provides an efficient and extendable way of exposing, persisting and retrieving educational entities and the relationships between them. The model provides the ability to have a template object (e.g., for a course) and have multiple instances of that object, thereby supporting differences between instances of that course (e.g., teachers and times). At the same time, the model is extendable to capture new entities, such as outcomes and rubrics, and tie their relationships to existing entities.

While a large number of educational entities, relationships and so forth may exist in any given configuration, it is understood that only a relatively small number of examples are described herein. Thus it should be understood that any of the examples described herein are non-limiting examples. Moreover, other fields such as healthcare, finance and so forth may benefit from the technology described herein. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and object models in general.

Figure 1:
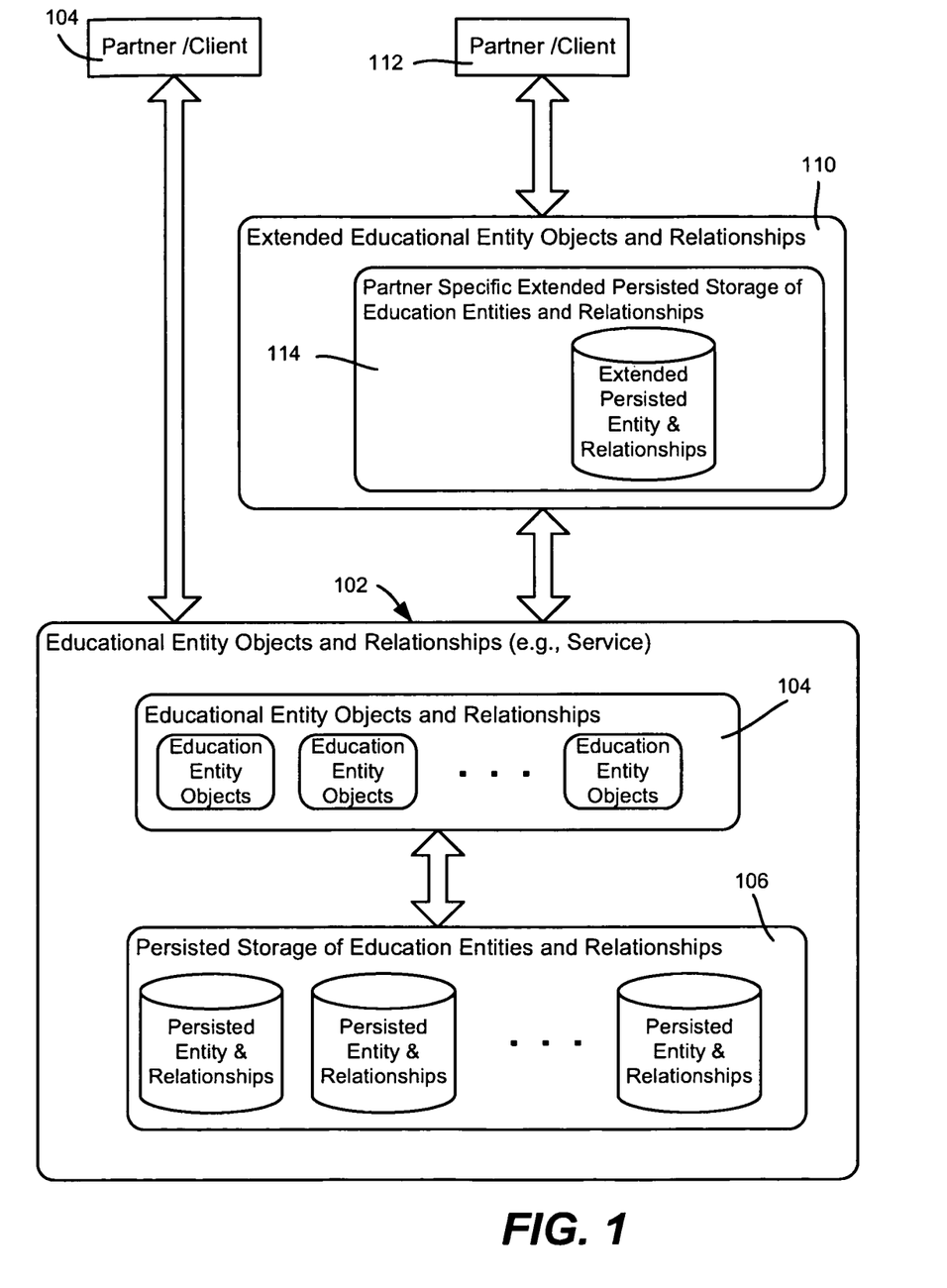
FIG. 1 is a block diagram showing example components of an educational entity architecture including a service that maintains and provides access to educational entity objects and relationships.

Turning to FIG. 1, there is shown an architecture for an educational entity object model, in which the model presents entities related to a learning environment and the relationships between them. In general, objects are used to represent the entities, while the relationships are maintained using tables at a database level.

In general, the model may be implemented as a service 102 or the like (e.g., a web service and/or a SharePoint® shared service) for access by via partners/clients 104 (hereinafter "clients"), such as educational institution users, e.g., administrators, teachers and students. One suitable set of interfaces for accessing the objects is described in the aforementioned related patent application entitled "Educational Service and Contracts."

The service 102 instantiates the entities as objects 106 from persisted storage 108 while maintaining their relationships. While in one implementation the service 102 is provided as a "cloud" service, it is understood that an alternative service may be implemented in any suitable manner, e.g., in a local network of an educational institution.

As shown in FIG. 1, the clients 104 may interface with the service 102, however as also represented in FIG. 1, extensibility is built in via extended educational entity objects and relationships (block 110). To this end, as represented by the block 112, another client may persist its own extended objects 114, and have those extended objects 114, as well as the objects provided by the object model of the service 102, exposed for client access. These objects may represent new educational entities, and/or may further customize the educational entities that are provided via the service 102. Once recorded and tracked, these extended entities become part of an overall system that applications and the like (solutions) atop the system access together.

Figure 2A:
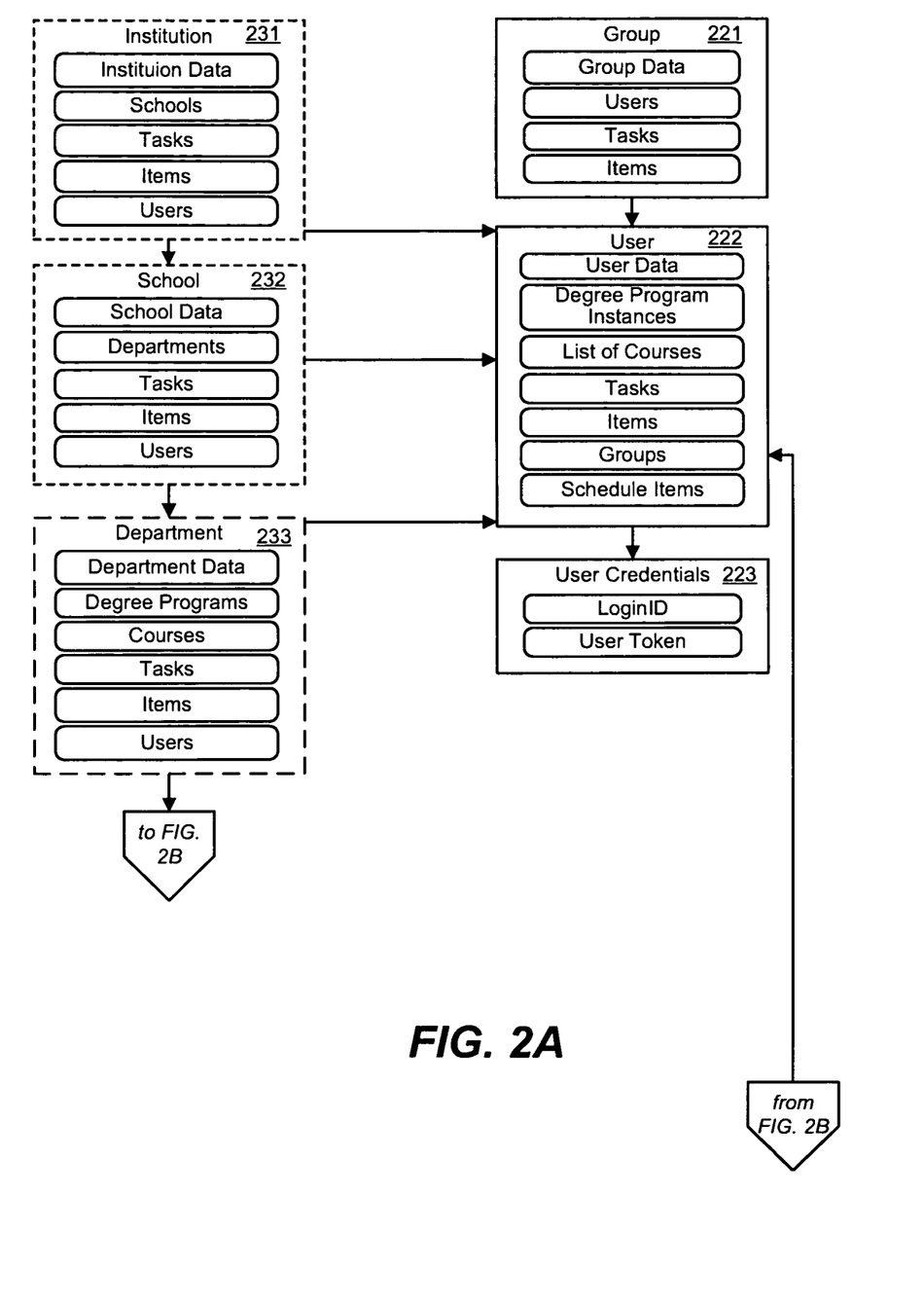
FIGS. 2A and 2B comprise a representation of an educational entity object model showing relationships between educational entities.
Figure 2B:
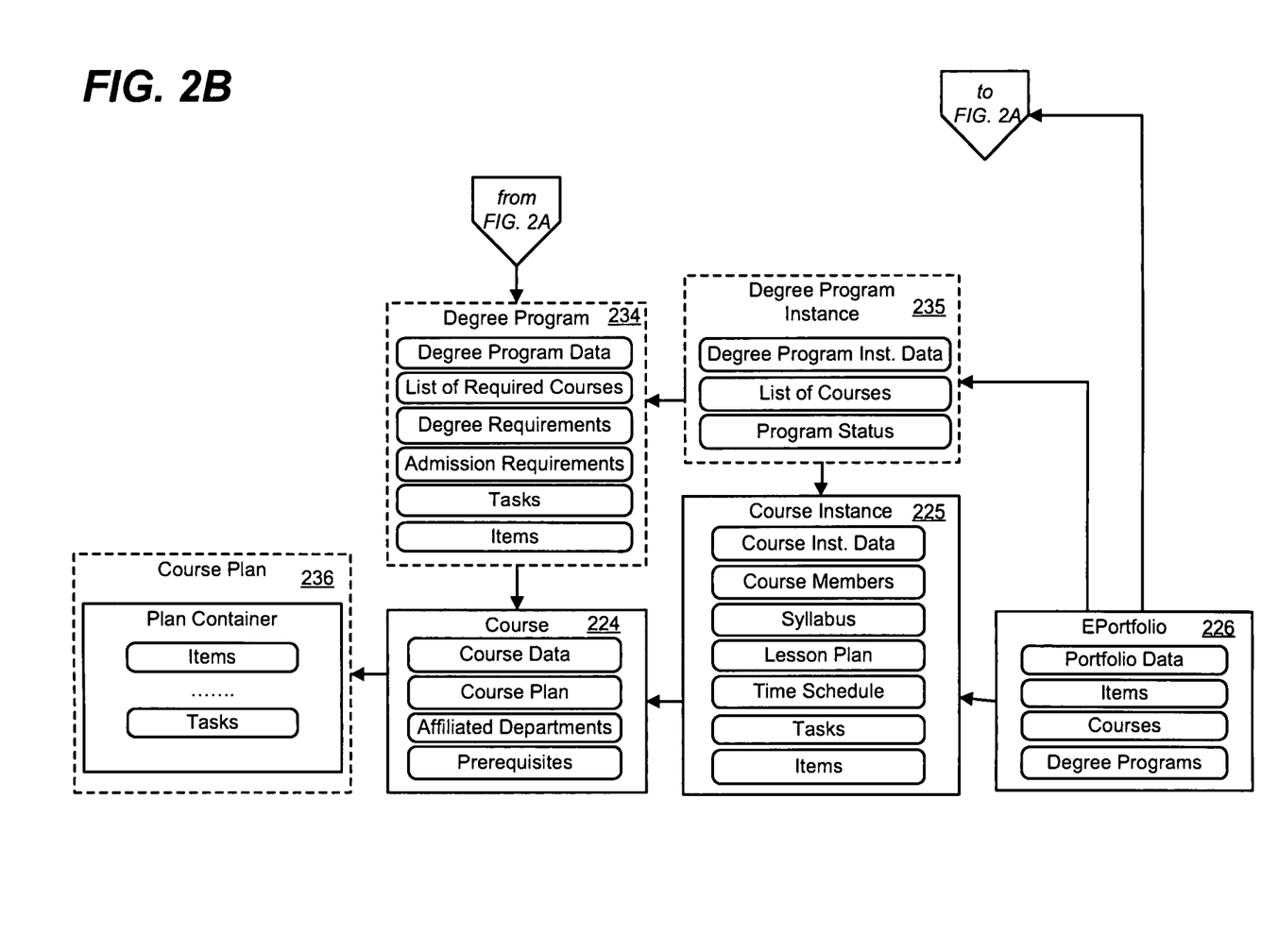

FIGS. 2A and 2B comprise a representation of one educational entity object model showing relationships between educational entities. Note that certain sets of educational objects are maintained as "first-class" educational objects 221-226, including, Group, User, User Credentials, Course, Course-Instance and EPortfolio, as generally represented by the solid-lined boxes. While these first-class educational objects are themselves entities, "entity" is also generally used to refer to other objects, such as entities 231-236, including Institution, School, Department, Degree Program, Degree Program-Instance, and Course Plan as represented by the dashed-line boxes. Note that the solid lined boxes are applicable for virtually any institution, e.g., elementary through high school (K-12) and Motivated Learner/Educator institutions, while the dashed lined boxes are more optional for Motivated Learner/Educator institutions. The department object (block 233) is optional for both K-12 and Motivated Learner/Educator institutions.

As can be seen in FIG. 2, the educational entity architecture and object model provide a model for persisting educational entities and relationships. It captures the relationship between an educational entity like course, department, institutions and its associated materials, memberships with role, associated task, and so forth. The educational entity object model thus represents the common entities of a learning environment and the relationships between them. Most of the first class entities like Course, Course Instance and Department have common attributes (sub-entities) such as tasks, Items and a set of users.

Figure 3:
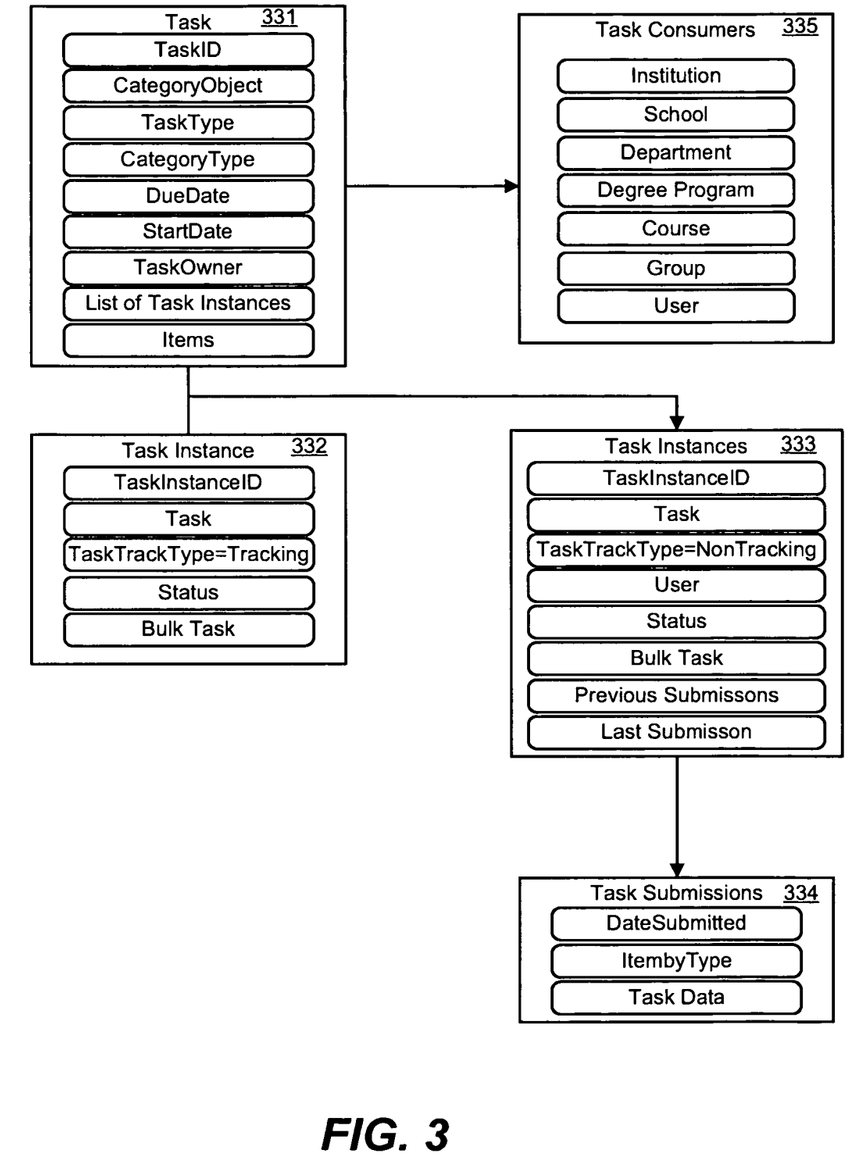
FIG. 3 is a representation of tasks and task-related relationships within an educational entity object model.

With respect to tasks, FIG. 3 shows a task object 331, and its relationships with task instances 332 and 333 (which are also related to task submissions 334). As can be seen, a task is something that can be assigned to various types of consumers 335.

As seen in FIGS. 2A, 2B and 3, the model thus provides the concept of having a template object (e.g., for a task, a course and so forth) and have multiple instances of that template object. By way of example, an institution administrator may create a "Physics 101" course, which can have multiple instances taught by different teachers at the same time period and/or different time periods.

Figure 4A:
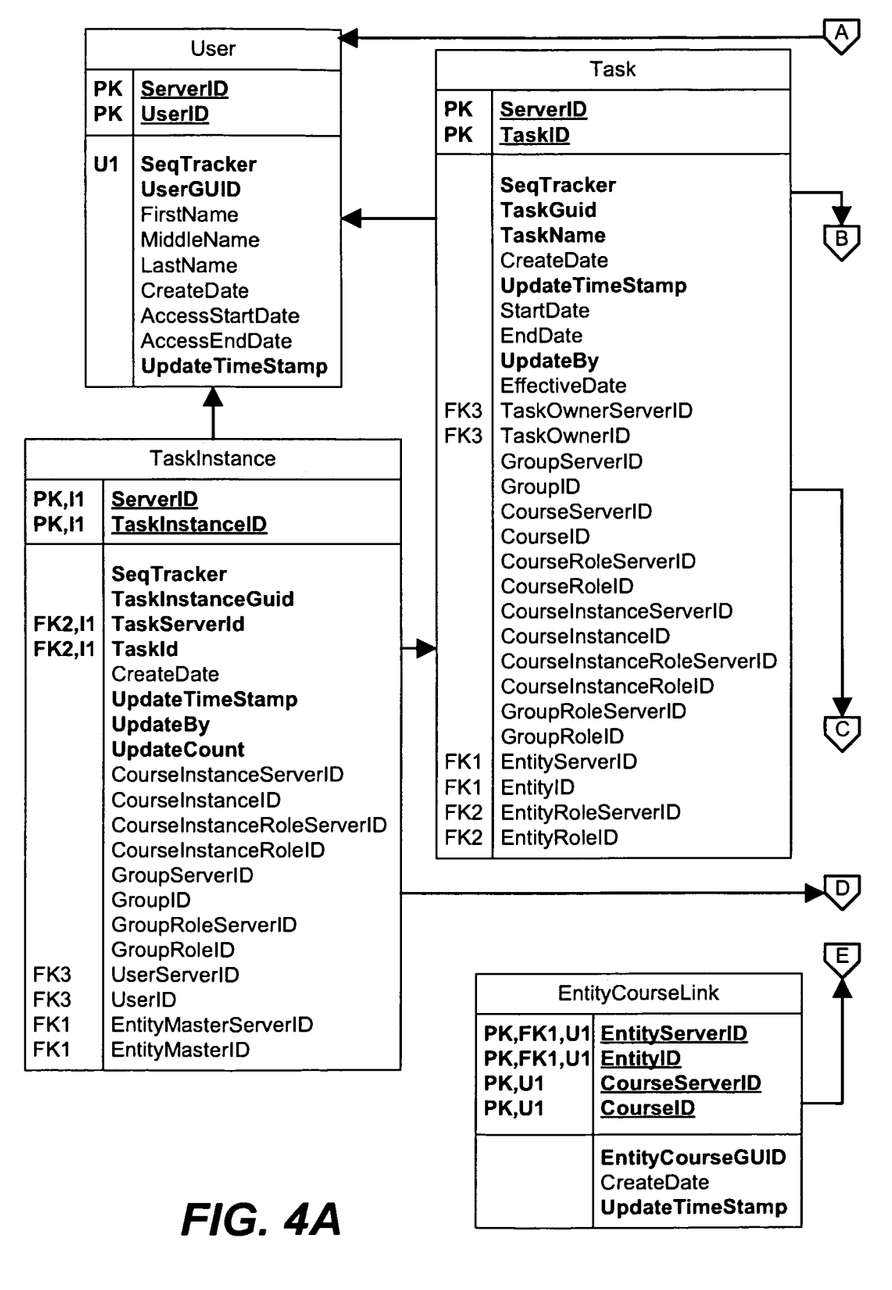
FIGS. 4A-4C comprise a representation of an architecture for persistent storage of an educational entity object model.
Figure 4B:
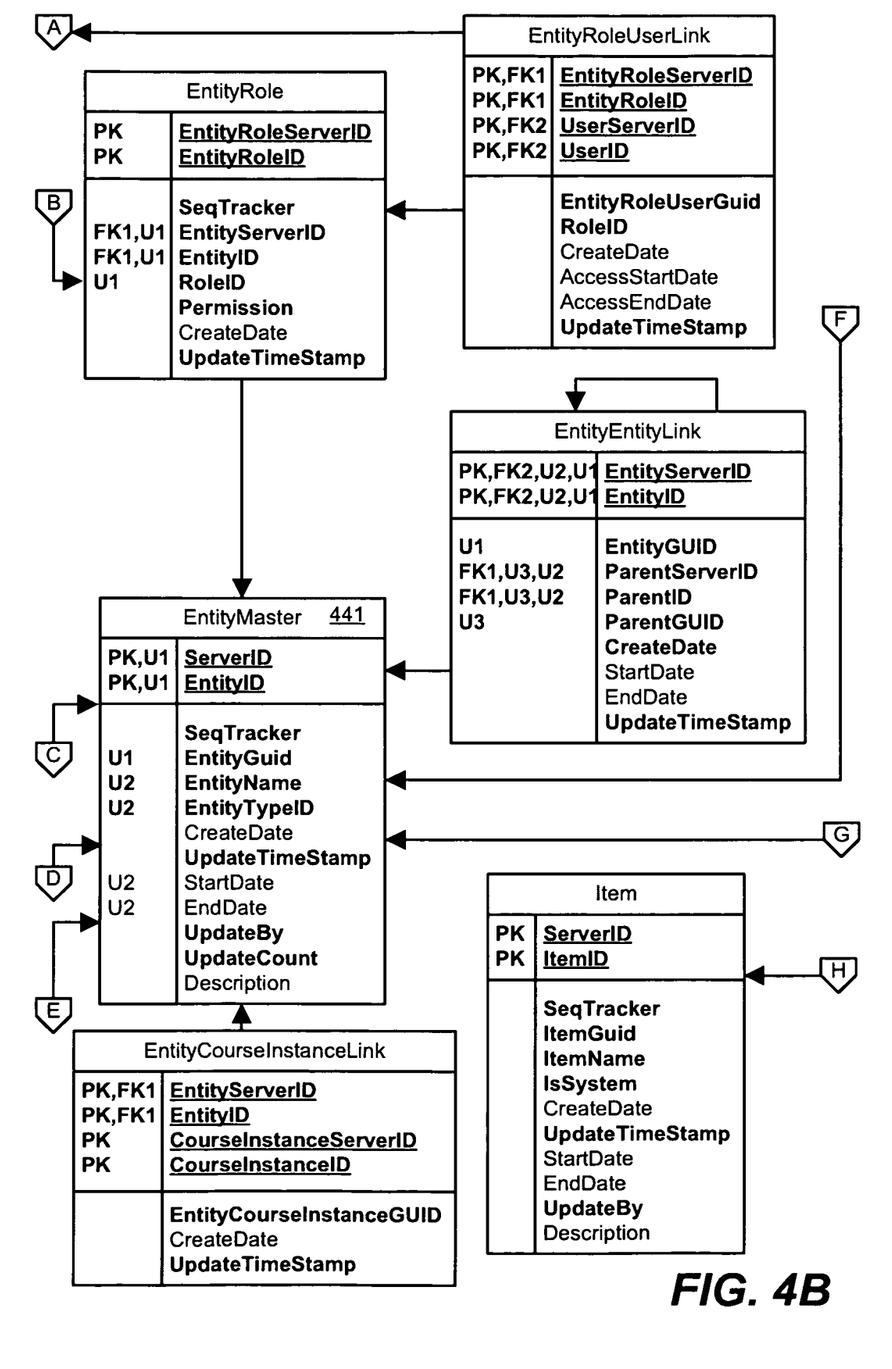
Figure 4C:
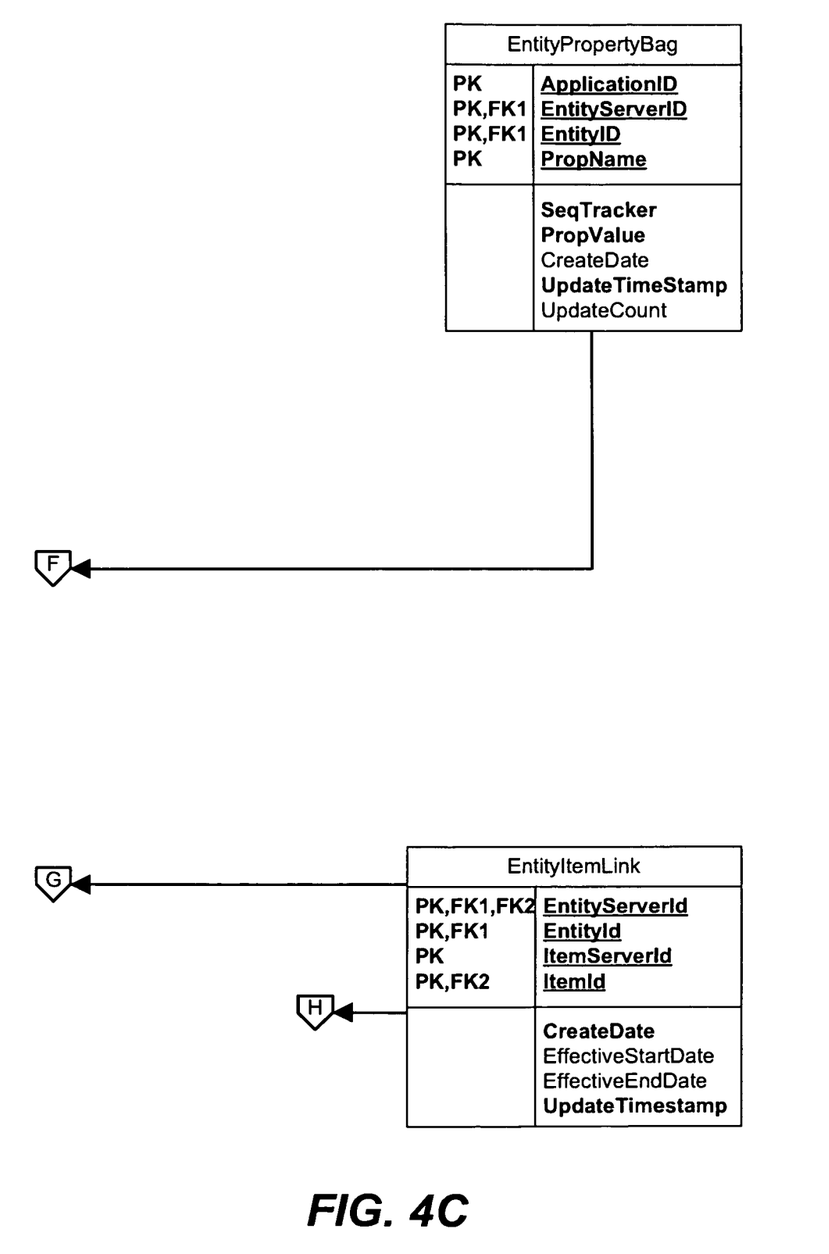

With respect to the persistent storage, at the database level, the relationships between educational entities are maintained as relationships between the tables using the architecture generally represented in FIGS. 4A-4C. The tables are representative of educational objects in the middle tier (as described in the related patent application), the same relationship is maintained by using the composition of IDs (GUIDs) of the related educational object.

Note that instead of using different tables for different entities, one implementation uses one table (e.g., EntityMaster 441, FIG. 4B) that contains the entities, and uses type discrimination to differentiate entities. For example, the EntityMaster table contains a field called EntityTypeID that specifies the type of each record.

Another similar relationship exists between other educational objects between Items (documents) and first class educational objects (Courses, Groups). This is represented in the database using a fork or multiplexed table, (comprising a table that has reference to other tables, e.g., implementing a 1-to-N relationship). In this case, each Item is related to the Course or Group at the database level, however this relationship is not indicated at the educational object level directly. Instead, the relationship comes from an API (e.g., as described in the related patent application), wherein the Items are accessed based on the context or the first-class educational object only, e.g., Course is used to get Items related to course.

The entity object model (and its relationships) is exposed to the clients 104 and 112 to consume, e.g., via the service 102. At the same time, the model's architecture allows new entities along with new relationships between them to be added easily. In other words, the model provides extensibility for educational entity object model, relationships between educational entities and persistent storage for educational entity object model.

One way that extensibility is facilitated is through the "non-first-class" objects, which in general are generic educational objects including those represented by the dashed-lined boxes in FIGS. 4A-4C. The type is defined in the EntityType that identifies the "Type" of the educational object. This provides a robust, simple, consistent and effective way to extend the relationships between the entities, including future entities, without requiring additional development.

More particularly, an entity educational object is stored in its own table and maintains the relationships. This provides an extensible persistent storage for the educational entity object model, without requiring special database maintenance or manipulation for each entity type at run time.

As can be seen, the educational entity and object model provides an efficient and logical way of capturing educational relationships and data. The model helps to capture education-related data in a logical way that is used for improving educational effectiveness for both student and teacher users, e.g., by helping each user see relevant information from his or her own perspective.

Moreover, the model can used to provide institutions with other benefits, such as data mining and analysis. Because the data is maintained together, including with its relationships, the mining and analysis are efficient.

Exemplary Operating Environment

Figure 5:
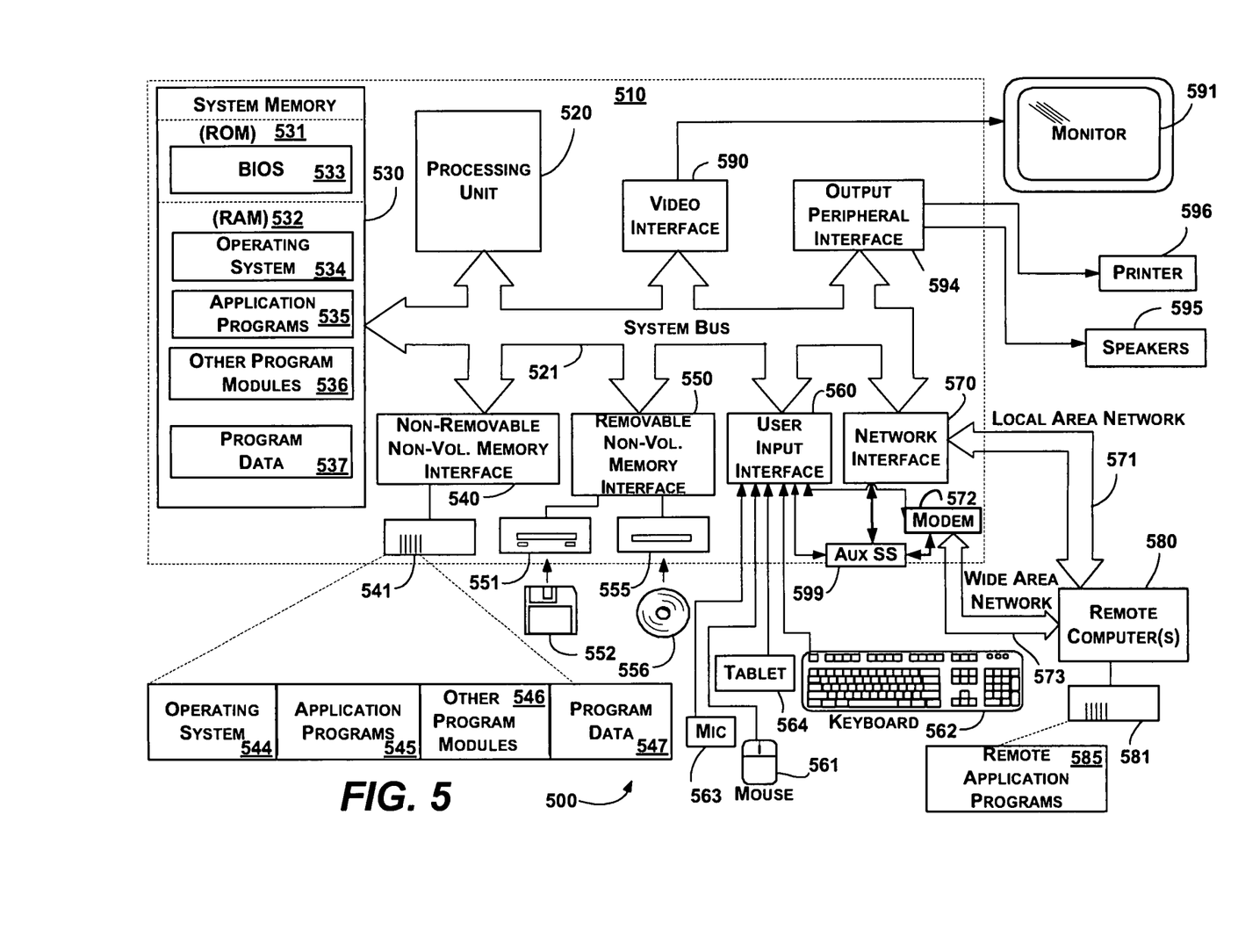
FIG. 5 shows an illustrative example of a computing environment into which various aspects of the present invention may be incorporated.

FIG. 5 illustrates an example of a suitable computing and networking environment 500 on which the examples of FIGS. 1-4C may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device. By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
   at least one processor;
   a memory communicatively coupled to the at least one processor and including processor-executable instructions comprising:
   a set of objects representing educational entities of an educational model, including course objects that represent courses, the course objects instantiated into one or more course instances, at least some of the course instances associated with a task, each task instantiated into one or more task instances that include task-related information for access by users of the educational model, wherein the one or more course instances include information that is specific to each respective course instance, wherein the set of objects is pre-defined, and wherein the set of objects is extended with an extended object beyond the pre-defined set of objects by associating the extended object with at least one object of the pre-defined set of objects;
   wherein the set of objects representing educational entities includes a user object that includes data corresponding to at least one course or course instance, at least one task or task instance, and a user credentials object associated with the user object.

2. The system of claim 1 wherein at least one task is associated with a task consumer object of a user that includes data corresponding to that user, and wherein at least one task is instantiated into a task instance that includes data corresponding to at least one task submission.

3. The system of claim 1 further comprising a persistent storage for maintaining the set of objects.

4. The system of claim 1 wherein the set of objects include generic objects defined by a type.

5. The system of claim 1 wherein the set of objects representing educational entities includes a group object that includes data corresponding to a plurality of users grouped from among the users of the educational model.

6. The system of claim 1 wherein the set of objects representing educational entities includes a degree program object that includes data corresponding to a set of courses associated with that degree program.

7. The system of claim 1 wherein the set of objects representing educational entities includes a course plan object associated with a course or course instance object.

8. The system of claim 1 wherein the set of objects representing educational entities includes an object containing portfolio data.

9. The system of claim 1 wherein the set of objects representing educational entities includes an institution object that includes data corresponding to at least one school.

10. The system of claim 1 wherein the set of objects representing educational entities includes a school object that includes data corresponding to at least one department.

11. The system of claim 1 wherein the set of objects representing educational entities includes a department object that includes data corresponding to at least one degree program.

12. The system of claim 1 further comprising an entity master table that contains data corresponding to the entities, and maintains data that for at least some of the entities indicates relationships between entities.

13. In a computing environment, a system comprising:
   at least one processor;
   a memory communicatively coupled to the at least one processor and including processor-executable instructions comprising:
   a set of objects representing educational entities of an educational model, each object in the set of objects defined by an entity type that identifies a type of educational object, the set of objects including course objects that represent courses, task objects that represent tasks, user objects that represent users of the educational model, wherein the set of objects are extended with an extended object that has a relationship with at least one object in the set of objects;
   wherein the set of objects representing educational entities includes a user object that includes data corresponding to at least one course or course instance, at least one task or task instance, and a user credentials object associated with the user object; and
   one or more database tables that maintains relationships between each object in the set of objects, including the courses, the tasks and the users, wherein at least one object of the set of objects is configured to instantiate at least one instance of the respective at least one object, wherein each at least one instance includes object properties which are common to each of the at least one instances of the respective object, and wherein each of the at least one instances of the respective object includes instance properties that are specific to the respective instance of the respective object, the set of objects and database tables maintained in a persistent storage.

14. The system of claim 13 wherein the set of objects are accessed via interfaces corresponding to a web service or a SharePoint® shared service, or both a web service and a SharePoint® shared service.

15. The system of claim 13 wherein the set of objects includes a user credentials object, a group object, a degree program object, a course plan object, an institution object, a school object, or a department object, or any combination of a user credentials object, a group object, a degree program object, a course plan object, an institution object, a school object, or a department object.

16. One or more computer storage devices storing computer-executable instructions, which in response to execution by a computer cause the computer to perform steps, comprising:

maintaining a table, in which educational entities of an object model are maintained in rows of the table, each row having a field that identifies which entity of the object model is represented by that row and including properties of the respective entity, the table configured to be accessed to determine relationships between an instantiated object for an entity and at least one other instantiated object for another entity, including a course object instance that identifies a course and an instance of the course and a user object instance that represents a student taking that instance of the course; and a set of objects representing educational entities includes a user object that includes data corresponding to at least one course or course instance and at least one task or task instance, and a user credentials object associated with the user object.

17. The one or more computer storage devices of claim 15 further comprising:

a task object instance that has a relationship with the course object instance and the user object instance.

\* \* \* \* \*